(No Model.)
P. RIESECK.
CLAMPING DEVICE.
No. 411,967. Patented Oct. 1, 1889.
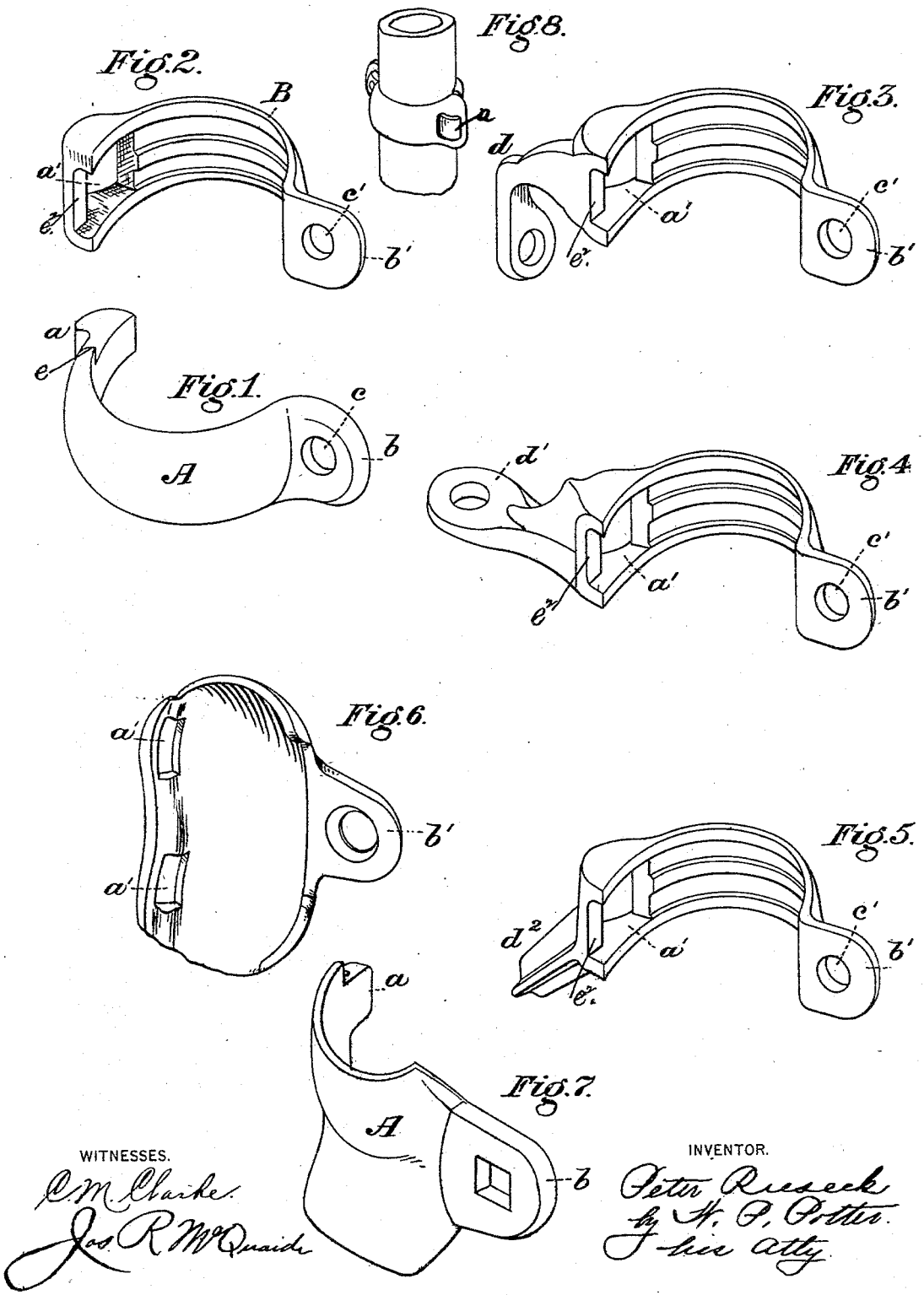
WITNESSES.
C. M. Clarke.
Jos. R. McQuaide
INVENTOR.
Peter Rieseck
by H. P. Potter
his Atty.

UNITED STATES PATENT OFFICE.

PETER RIESECK, OF ALLEGHENY, PENNSYLVANIA.

CLAMPING DEVICE.

SPECIFICATION forming part of Letters Patent No. 411,967, dated October 1, 1889.

Application filed February 23, 1889. Serial No. 300,982. (No model.)

*To all whom it may concern:*

Be it known that I, PETER RIESECK, of Allegheny, county of Allegheny, State of Pennsylvania, have invented or discovered a new and useful Improvement in Clamping Devices; and I do hereby declare the following to be a full, clear, concise, and exact description thereof, reference being had to the accompanying drawings, making a part of this specification, in which like letters indicate like parts.

My invention relates to that class of devices used in connecting together the various portions of structures generally composed of iron pipes, columns, and such material as is used in the construction of fire-escapes, stairways, and the like, and in which it is necessary to attach to the various portions of the structure, hand-rails, steps, brackets, and braces of various kinds, which require to be secured and held in place without drilling holes through the metal; and the invention consists in the construction and arrangement of parts, as will be hereinafter described, and particularly pointed out in the claim.

In the accompanying drawings, Figure 1 is a view of the male part of my improved clamping device. Figs. 2, 3, 4, and 5 show, respectively, various forms of the female part of my improvement. Figs. 6 and 7 are mates, and represent modification and form of my improvement adapted to be used on a curved rail or corner. Fig. 8 is a view of the clamp in its most common form of application as applied to a pipe or column.

The letter A, as shown in Fig. 1, is the male portion of my improved clamp, and this part is adapted to engage with the female parts B of said clamp, as shown in Figs. 2, 3, 4, and 5. The male part A engages and interlocks with any one of the female parts by means of the lug $a$, as shown in Fig. 1, with the part $a'$ of the other figures, and the bringing together of the other ends $b$ $b'$ of the clamp, and securing them by means of a bolt through the openings $c$ $c'$, which makes the clamp operative and permits of its closing as tightly as may be desired upon any object to which it may be applied.

The lug end $a$ of the male part A is formed with a shoulder $e$, and the corresponding end of the part B is enlarged, so that it can be provided with a through opening $a'$ and a recess $e^2$ at its front edge, so as to interlock with the shouldered and lug end of the part A.

The female part A of the clamp adjacent to the locking-recess $e^2$ is provided with a projection, which may be of the forms indicated by the letters $d$, $d'$, and $d^2$, respectively, in Figs. 3, 4, and 5 of the drawings, and the projection may have an aperture through which may be passed a bolt to secure the clamp to any parts of the work attached.

Referring to Figs. 6 and 7, there is shown a modification of the clamp adapted to be applied to a curved railing or an elbow, the same principle of construction being shown, and Fig. 7 representing the male part A, which engages at the part $a$ with the corresponding part $a'$ of Fig. 6, and the lug $b$ of Fig. 7 in like manner joining with $b'$ of Fig. 6 in the operation of the clamp.

My clamp is likewise adapted, when desired, to attach to T-shaped or square columns as well as to those of circular form.

The particular advantage of my invention consists in the formation of a perfectly-rigid joint after the two parts of the clamp are fastened together. When so fastened, the shoulder $e$ will jam against the upper outer wall, the heel of the lug against one inner wall of the recess, and the hook against the other inner wall of said recess. By this means any strain put upon the clamp will only tend to tighten the joint.

Having described my invention, what I claim is—

The combination, with the part A, having at one end a lug $a$ and shoulder $e$, of the part B, having its corresponding end enlarged and provided with a through opening $a'$ and recess $e^2$, whereby the lug $a$ is secured through the opening $a'$ and into recess $e^2$, the shoulder $e$ abutting against the outside wall of said enlarged end, and said parts A and B being secured together by a bolt passing through openings in the opposite ends thereof, substantially as described.

In testimony whereof I have hereunto set my hand.

PETER RIESECK.

Witnesses:
JOHN E. POTTER,
JOS. R. MCQUAIDE.